United States Patent
Mwanje et al.

(10) Patent No.: US 12,034,610 B2
(45) Date of Patent: *Jul. 9, 2024

(54) NETWORK OBJECTIVES MANAGEMENT

(71) Applicant: Nokia Solutions and Networks Oy, Espoo (FI)

(72) Inventors: Stephen Mwanje, Dorfen (DE); Lars Christoph Schmelz, Haar (DE)

(73) Assignee: Nokia Solutions and Networks Oy, Espoo (FI)

( * ) Notice: Subject to any disclaimer, the term of this patent is extended or adjusted under 35 U.S.C. 154(b) by 340 days.

This patent is subject to a terminal disclaimer.

(21) Appl. No.: 17/296,757

(22) PCT Filed: Nov. 30, 2018

(86) PCT No.: PCT/EP2018/083103
§ 371 (c)(1),
(2) Date: May 25, 2021

(87) PCT Pub. No.: WO2020/108768
PCT Pub. Date: Jun. 4, 2020

(65) Prior Publication Data
US 2022/0029896 A1 Jan. 27, 2022

(51) Int. Cl.
*H04L 12/24* (2006.01)
*H04L 41/14* (2022.01)
(Continued)

(52) U.S. Cl.
CPC ........ *H04L 41/5009* (2013.01); *H04L 41/145* (2013.01); *H04W 24/02* (2013.01)

(58) Field of Classification Search
CPC ... H04L 41/5009; H04L 41/145; H04W 24/02
(Continued)

(56) References Cited

U.S. PATENT DOCUMENTS

| 10,009,784 B1 * | 6/2018 | Evircan | H04L 41/142 |
| 2009/0111382 A1 | 4/2009 | Yao | |

(Continued)

FOREIGN PATENT DOCUMENTS

| CN | 101064900 A | 10/2007 |
| CN | 103190173 A | 7/2013 |

(Continued)

OTHER PUBLICATIONS

Chinese Patent Application No. 201880100658.6.*
(Continued)

*Primary Examiner* — Gbemileke J Onamuti
(74) *Attorney, Agent, or Firm* — Nokia Technologies Oy

(57) ABSTRACT

There are provided measures for network objectives management. Such measures for enabling network objectives management in radio access networks exemplarily comprise maintaining a plurality of key performance indicator entries, each key performance indicator entry comprising at least an optimization direction of a respective key performance indicator and prioritized target values for said respective key performance indicator, and providing said prioritized target values for a selected key performance indicator expected to be achieved by a cognitive function to said cognitive function.

19 Claims, 9 Drawing Sheets

---

S31: maintaining a plurality of key performance indicator entries, each key performance indicator entry comprising at least an optimization direction of a respective key performance indicator and prioritized target values for said respective key performance indicator S32: providing said prioritized target values for a selected key performance indicator expected to be achieved by a cognitive function to said cognitive function

(51) Int. Cl.
*H04L 41/5009* (2022.01)
*H04W 24/02* (2009.01)

(58) Field of Classification Search
USPC .......................................................... 370/252
See application file for complete search history.

(56) References Cited

U.S. PATENT DOCUMENTS

| | | | |
|---|---|---|---|
| 2014/0336984 | A1 | 11/2014 | Starr |
| 2017/0264488 | A1* | 9/2017 | Ben Ami ............ H04L 41/5009 |
| 2022/0014449 | A1* | 1/2022 | Mwanje ................ H04L 41/145 |

FOREIGN PATENT DOCUMENTS

| | | |
|---|---|---|
| CN | 103875282 A | 6/2014 |
| CN | 104094651 A | 10/2014 |
| CN | 108616462 A | 10/2018 |
| WO | 2018/042232 A1 | 3/2018 |

OTHER PUBLICATIONS

Office action received for corresponding European Patent Application No. 18811805.3, dated Jan. 20, 2023, 5 pages.

Office action received for corresponding Chinese Patent Application No. 201880100658.6, dated Jun. 5, 2023, 11 pages of office action and no page of translation available.

"3rd Generation Partnership Project; Technical Specification Group Services and System Aspects; Study on Architecture for Next Generation System (Release 14)", 3GPP TR 23.799, V14.0.0, Dec. 2016, pp. 1-522.

"3rd Generation Partnership Project; Technical Specification Group Radio Access Network; Evolved Universal Terrestrial Radio Access Network (E-UTRAN); X2 application protocol (X2AP) (Release 15)", 3GPP TS 36.423, V15.1.0, Mar. 2018, pp. 1-354.

Frenzel, "Objective-Driven Operations of Self-Organizing Networks", Dissertation, Mar. 2016, 281 pages.

Hamalainen et al., LTE Self-Organising Networks (SON): Network Management Automation for Operational Efficiency, John Wiley & Sons, Dec. 2011, pp. 40-80.

International Search Report and Written Opinion received for corresponding Patent Cooperation Treaty Application No. PCT/EP2018/083103, dated Jul. 5, 2019, 13 pages.

Mwanje et al., "Towards Cognitive Autonomous Networks in 5G", ITU Kaleidoscope: Machine Learning for a 5G Future (ITU K), Nov. 26-28, 2018, 8 pages.

Office action received for corresponding European Patent Application No. 18811805.3, dated Nov. 3, 2023, 8 pages.

Office action received for corresponding Chinese Patent Application No. 201880100658.6, dated Dec. 1, 2023, 3 pages of office action and no page of translation available.

Office action received for corresponding Chinese Patent Application No. 201880100658.6, dated Apr. 23, 2024, 8 pages of office action and No. page of translation available.

* cited by examiner

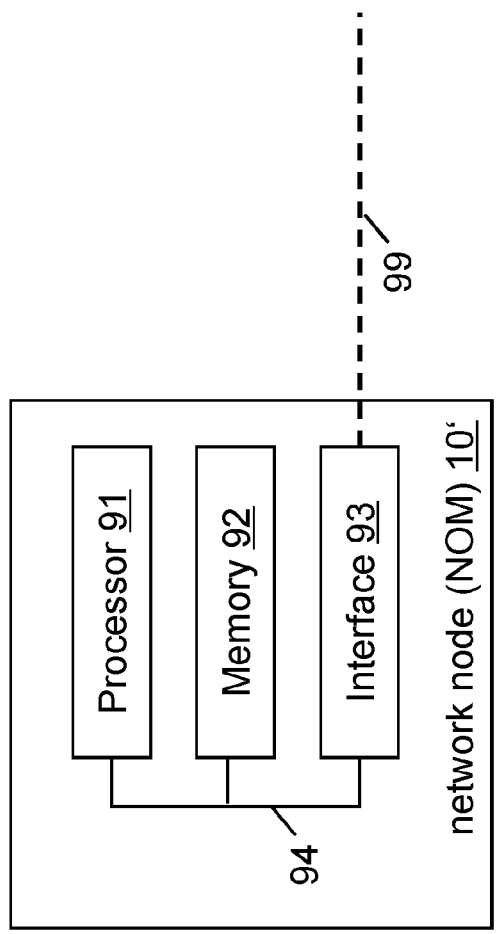

NETWORK OBJECTIVES MANAGEMENT

RELATED APPLICATION

This application was originally filed as Patent Cooperation Treaty Application No. PCT/EP2018/083103 filed Nov. 30, 2018, each of which is incorporated herein by reference in its entirety.

FIELD

The present invention relates to network objectives management. More specifically, the present invention exemplarily relates to measures (including methods, apparatuses and computer program products) for realizing network objectives management.

BACKGROUND

The present specification generally relates to cognitive network management (CNM) in 5G (radio access) networks, but it is applicable to other generations of wireless/mobile networks, including Long Term Evolution (LTE)/Long Term Evolution Advanced (LTE-A) and future generations. With the success of self-organizing networks (SON), but also its shortcomings in terms of flexibility and adaptability to changing and complex environments, there is a strong demand for more intelligent operations, administration and management (OAM) functions to be added to the networks.

The objective of CNM is that OAM functions are enabled to
1) learn the environment they are operating in,
2) learn their optimal behavior fitting to the specific environment,
3) learn from their experiences and that of other instances of the same or different OAM functions, and
4) learn to achieve the higher-level goals and objectives as defined by the network operator.

To achieve the desired network performance, each function must achieve specific targets, which are the values or value ranges for key performance indicators (KPI) to be achieved by the system.

The targets are achieved through uni- or multi-objective optimization processes aimed at achieving higher-level service- or application-specific goals like a specific Quality of Experience (QoE). An objective in that case is the (possibly context-specific) minimization/maximization of a set of KPIs that ensures that another set of KPIs is either minimized, maximized or unaffected as desired.

In general, the success of CNM will highly depend on how well the respective targets are set for each cognitive function (CF) and in a conflict-free way, i.e., it is necessary to ensure that the achievement of one objective does not come at the cost of the achievement of other objectives.

Doing this in a manual way (as was done for SON) is quite complex, so, automated solutions are needed for appropriately setting these targets.

For the concept of CNM, it is proposed to replace SON functions with CFs that learn optimal behavior based on their actions on the network, the observed or measured impact thereof, and using various kinds of data (e.g., network planning, configuration, performance and quality, failure, or user/service-related data).

The CFs learn actions that achieve the specific KPI targets for each respective CF. In SON, these targets were typically known to the system designer only in abstract form. Correspondingly, the system designer in the SON case either defined action policies that contribute to meeting these known targets or set termination conditions for the respective SON function.

This is not possible for CNM, since the functions will independently learn when to trigger and/or terminate specific actions, all of which depends on the specific function's objectives and targets. Moreover, it may be necessary to set the targets with consideration of the service differentiation To simplify network management, it is desirable that the detailed target setting for the individual CFs is as much as possible also automated, i.e. the operator shall be able to specify its higher-level goals (desired behavior of the network) and an automation module translates these goals into trigger conditions and achievement targets for the CFs. Concurrently, the respective targets need to be set in such a way that the CFs are (or the entire CNM is) able to manage their conflicts to find compromises among conflicting targets.

A general problem for network management remains the maximizing of the value to the operator and its shareholders (i.e. maximizing the revenue to cost ratio) while maximizing the network quality (which is to the benefit of customers and regulators). Correspondingly, network management will involve three major tasks, i.e.
1) minimizing cost e.g. by minimizing number of cells, energy use, etc.
2) maximizing revenue e.g. maximizing user admission, and
3) maximizing quality (of service/experience), e.g. maximizing service availability, throughput, or minimizing latency, interruptions, drops, link failures etc.

A challenge then is how to translate these high-level goals into low-level actions on the network.

An external system is proposed considering envisaged policy-based, goal-based, and objective-based network management, wherein the external system sets policies or rules for an underlying optimization function which then manages the network.

Therein, a policy may be defined as a statement of the operator's desired network behavior, i.e. it informs the network to "Behave in such a way such that . . . ". The policy defines the desired behavior either by setting targets, defining utilities of states, setting (non)acceptable states or defining actions. Three kind of policies are characterized:
a) Action policy: Change parameter(s) pi to pi=p or by $\delta P$,
b) Goal policy: This states a specific desired state for a measure(KPI) i.e. KPI ki sym k, where "sym" $\in$ [=, $\neq$, <, >, $\leq$, $\geq$], and
c) Utility Functions policy: This gives a comparison of states e.g. k=k1$\leftrightarrow$k=k2; where "$\leftrightarrow$" means "preferred (change) to".

This same structure applies for CNM in that a separate module sets targets which must be achieved by the CFs.

A SON objective manager is proposed as a module deriving context specific targets for each SON function using the vendors' SON functional model (a behavior model for each SON function), wherein objective based network management (OBNM) can be applied in the SON environment by defining context specific utility functions that are then used to configure and control the SON functions.

The CNM environment can however not rely on SON-style utility functions, since CNM uses independent learning-based optimization functions whose optimal actions are learned through experience. In particular, function models cannot be developed for the cognitive function since their learning nature indicates a non-deterministic behavior. In that respect, only the targets that need to be achieved by the CFs need to be defined.

A CF framework decomposing the work of an intelligent OAM function for a realistic implementation of CNM comprises five major components.

FIG. 4 is a schematic diagram illustrating an example of a system environment and in particular a network objectives manager NOM within the CNM system.

As illustrated in FIG. 4, the five major components are:
1) A Network Objectives Manager (NOM) which interprets operator service and application goals for CNM or for the specific CF to ensure that the CF adjusts its behavior in line with those goals,
2) An Environment Modelling & Abstraction (EMA) which learns to abstract the environment into states which are used for subsequent decision making in the other components,
3) A Configuration Management Engine (CME) which defines, learns and refines the permissible candidate network configurations for the different contexts of the CF,
4) A Decision & Action Engine (DAE) or simply Decision Application (DApp) which learns and matches the current abstract state (as derived by the EMA module) to the appropriate network configuration ('active configuration') selected from the set of legal/acceptable candidate network configurations (in practice multiple DApps may be required with each designed to focus on a specific network challenge like optimizing energy efficiency or maximizing mobility robustness), and
5) A Coordination Engine (CE) which needs to coordinate the actions and recommendations of multiple DAEs or CFs (even amidst the non-deterministic behavior of the DAEs or CFs resulting from their learning nature).

According to this concept illustrated in FIG. 4, the NOM provides its interpretation of the operator and service goals as input to the other blocks that then accordingly adjust their internal structures and subsequently their behavior.

The CNM (and the CFs) is (are) configured with the desired KPI targets and their relative importance, which then the CFs attempt to achieve through learning the effects of different network configurations.

Without the NOM, such targets would be manually set by the operator who analyses the overall business and technical goals (or Key Quality Indicators, KQI) to derive the network KPI targets and their relative priorities. The NOM may replace this manual operation by breaking down the input KQIs into the output which are the weighted/prioritized KPI targets. The input (operator goals or KQIs) may usually be at a different level of abstraction compared to the outputs.

The above concept leaves open the internal design and/or realization of the NOM.

Hence, the problem arises that if CNM including a NOM is intended to be implemented, the NOM and its respective interfaces need to be specified.

Hence, there is a need to provide for network objectives management.

SUMMARY

Various exemplary embodiments of the present invention aim at addressing at least part of the above issues and/or problems and drawbacks.

Various aspects of exemplary embodiments of the present invention are set out in the appended claims.

According to an exemplary aspect of the present invention, there is provided a method for enabling network objectives management in radio access networks, the method comprising maintaining a plurality of key performance indicator entries, each key performance indicator entry comprising at least an optimization direction of a respective key performance indicator and prioritized target values for said respective key performance indicator, and providing said prioritized target values for a selected key performance indicator expected to be achieved by a cognitive function to said cognitive function.

According to an exemplary aspect of the present invention, there is provided an apparatus for enabling network objectives management in radio access networks, the apparatus comprising at least one processor, at least one memory including computer program code, and at least one interface configured for communication with at least another apparatus, the at least one processor, with the at least one memory and the computer program code, being configured to cause the apparatus to perform maintaining a plurality of key performance indicator entries, each key performance indicator entry comprising at least an optimization direction of a respective key performance indicator and prioritized target values for said respective key performance indicator, and providing said prioritized target values for a selected key performance indicator expected to be achieved by a cognitive function to said cognitive function.

According to an exemplary aspect of the present invention, there is provided an apparatus for enabling network objectives management in radio access networks, the apparatus comprising maintaining circuitry configured to maintain a plurality of key performance indicator entries, each key performance indicator entry comprising at least an optimization direction of a respective key performance indicator and prioritized target values for said respective key performance indicator, and providing circuitry configured to provide said prioritized target values for a selected key performance indicator expected to be achieved by a cognitive function to said cognitive function.

According to an exemplary aspect of the present invention, there is provided a computer program product comprising computer-executable computer program code which, when the program is run on a computer (e.g. a computer of an apparatus according to any one of the aforementioned apparatus-related exemplary aspects of the present invention), is configured to cause the computer to carry out the method according to any one of the aforementioned method-related exemplary aspects of the present invention.

Such computer program product may comprise (or be embodied) a (tangible) computer-readable (storage) medium or the like on which the computer-executable computer program code is stored, and/or the program may be directly loadable into an internal memory of the computer or a processor thereof.

Any one of the above aspects enables an efficient provision of mechanisms and interfaces through which the target setting can be automated to allow the operator to focus on the higher-level objectives, and in particular the design and realization of the network objective manager (NOM) module of a CNM system, to thereby solve at least part of the problems and drawbacks identified in relation to the prior art.

By way of exemplary embodiments of the present invention, there is provided network objectives management. More specifically, by way of exemplary embodiments of the present invention, there are provided measures and mechanisms for realizing network objectives management.

Thus, improvement is achieved by methods, apparatuses and computer program products enabling/realizing network objectives management.

BRIEF DESCRIPTION OF THE DRAWINGS

In the following, the present invention will be described in greater detail by way of non-limiting examples with reference to the accompanying drawings, in which FIG. 9 is a block diagram alternatively illustrating an apparatus according to exemplary embodiments of the present invention.

DETAILED DESCRIPTION OF DRAWINGS AND EMBODIMENTS OF THE PRESENT INVENTION

Figure 1:
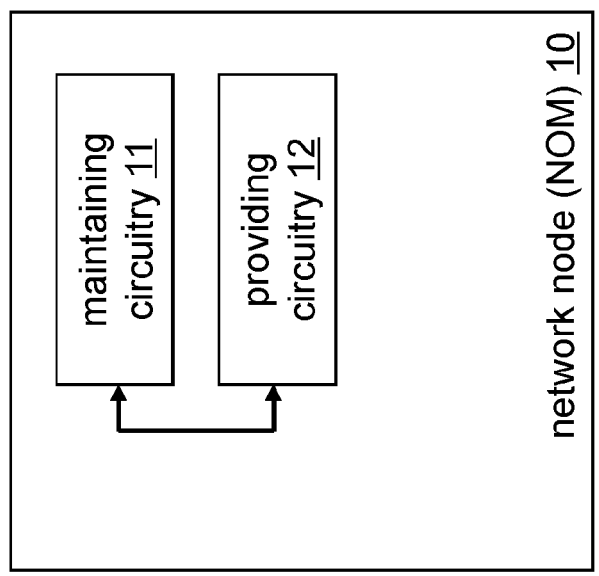
FIG. 1 is a block diagram illustrating an apparatus according to exemplary embodiments of the present invention.

The present invention is described herein with reference to particular non-limiting examples and to what are presently considered to be conceivable embodiments of the present invention. A person skilled in the art will appreciate that the invention is by no means limited to these examples, and may be more broadly applied.

It is to be noted that the following description of the present invention and its embodiments mainly refers to specifications being used as non-limiting examples for certain exemplary network configurations and deployments. Namely, the present invention and its embodiments are mainly described in relation to 3GPP specifications being used as non-limiting examples for certain exemplary network configurations and deployments. As such, the description of exemplary embodiments given herein specifically refers to terminology which is directly related thereto. Such terminology is only used in the context of the presented non-limiting examples, and does naturally not limit the invention in any way. Rather, any other communication or communication related system deployment, etc. may also be utilized as long as compliant with the features described herein.

Hereinafter, various embodiments and implementations of the present invention and its aspects or embodiments are described using several variants and/or alternatives. It is generally noted that, according to certain needs and constraints, all of the described variants and/or alternatives may be provided alone or in any conceivable combination (also including combinations of individual features of the various variants and/or alternatives).

According to exemplary embodiments of the present invention, in general terms, there are provided measures and mechanisms for (enabling/realizing) network objectives management.

In general, according to exemplary embodiments of the present invention, an NOM is provided, and its respective interfaces are specified.

The NOM is an objective interpretation function that that takes the operator's objectives and derives specific KPI targets for the CFs. In this case, instead of defining policies in terms of state-specific actions, goals or utilities, the NOM takes preferences on KPI values and derives the targets for the underlying cognitive functions.

According to exemplary embodiments of the present invention, on the input, the NOM takes the operational objectives from which it computes the KPI targets. The NOM checks for the consistence of the computed targets for the specific KPI and against other KPIs. Thereafter, the NOM keeps and tracks all the managed KPIs in an internal database with which it even learns the relations among KPIs. Finally, the NOM sets the KPI targets for the other CFs in the CNM system.

In the reverse direction, the NOM receives feedback from the CFs about targets that have been achieved or not. For the achieved targets, the NOM may choose to tighten the target where possible, otherwise, where the target is not achieved, the NOM may use that information to learn the necessary relations and corresponding action.

FIG. 1 is a block diagram illustrating an apparatus according to exemplary embodiments of the present invention in more detail. The apparatus may be a network node 10 such as a network objectives manager or a network entity providing such network objectives manager, for enabling network objectives management in radio access networks, the apparatus 10 comprising a maintaining circuitry 11 and a providing circuitry 12. The maintaining circuitry 11 maintains a plurality of key performance indicator entries, each key performance indicator entry comprising at least an optimization direction of a respective key performance indicator and prioritized target values for said respective key performance indicator. The providing circuitry 12 provides said prioritized target values for a selected key performance indicator expected to be achieved by a cognitive function to said cognitive function.

Figure 3:
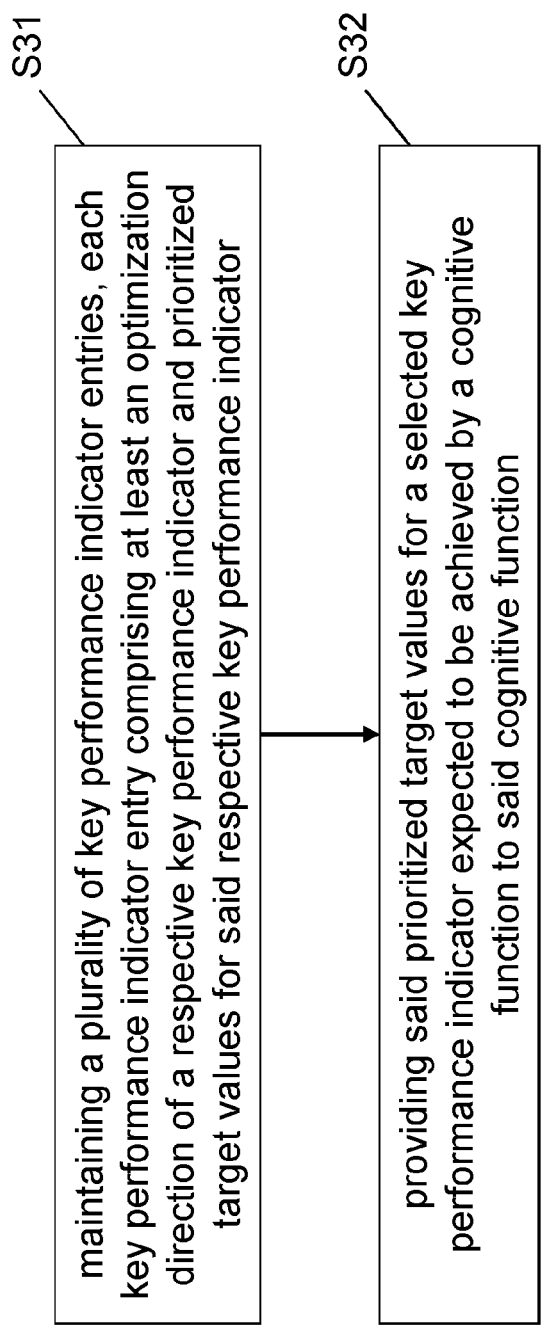
FIG. 3 is a schematic diagram of a procedure according to exemplary embodiments of the present invention.
Figure 4:
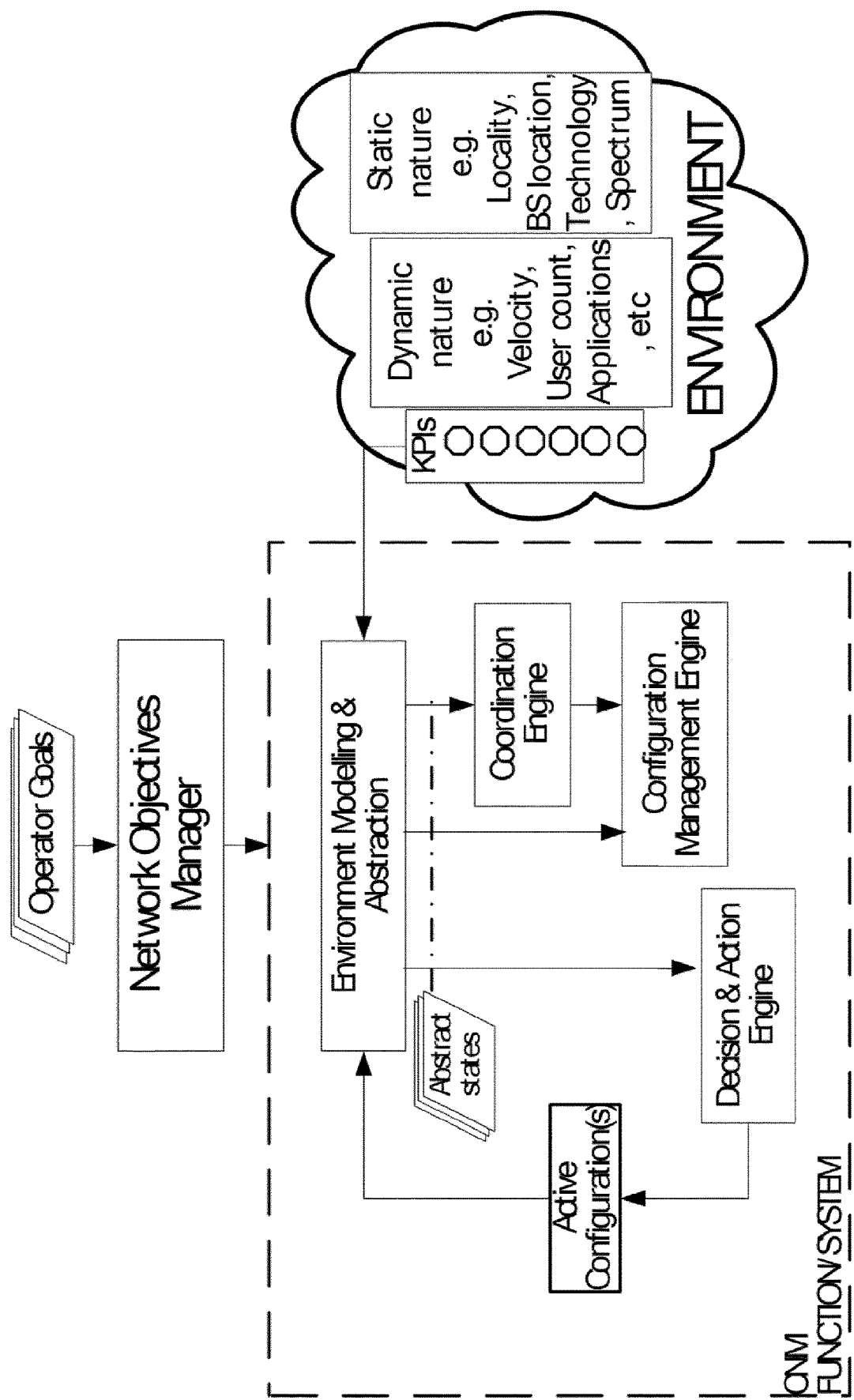
FIG. 4 is a schematic diagram illustrating an example of a system environment and in particular a network objectives manager NOM within the CNM system.

FIG. 3 is a schematic diagram of a procedure according to exemplary embodiments of the present invention. The apparatus according to FIG. 1 may perform the method of FIG. 3 but is not limited to this method. The method of FIG. 3 may be performed by the apparatus of FIG. 1 but is not limited to being performed by this apparatus.

As shown in FIG. 3, a procedure according to exemplary embodiments of the present invention comprises an operation of maintaining (S31) a plurality of key performance indicator entries, each key performance indicator entry comprising at least an optimization direction of a respective key performance indicator and prioritized target values for said respective key performance indicator, and an operation of providing (S32) said prioritized target values for a selected key performance indicator expected to be achieved by a cognitive function to said cognitive function.

Figure 2:
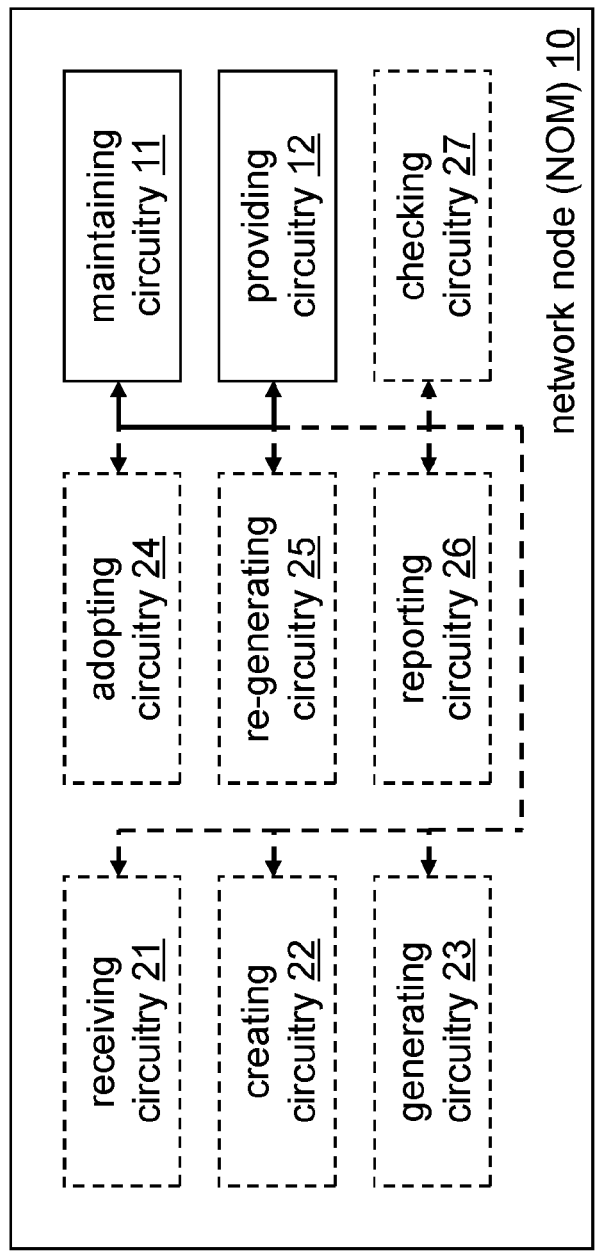
FIG. 2 is a block diagram illustrating an apparatus according to exemplary embodiments of the present invention.

FIG. 2 is a block diagram illustrating an apparatus according to exemplary embodiments of the present invention. In particular, FIG. 2 illustrates a variation of the apparatus shown in FIG. 1. The apparatus according to FIG. 2 may thus further comprise receiving circuitry 21, creating circuitry 22, generating circuitry 23, adopting circuitry 24, re-generating circuitry 25, reporting circuitry 26, and/or checking circuitry 27.

In an embodiment at least some of the functionalities of the apparatus shown in FIG. 1 (or 2) may be shared between two physically separate devices forming one operational entity. Therefore, the apparatus may be seen to depict the operational entity comprising one or more physically separate devices for executing at least some of the described processes.

According to a variation of the procedure shown in FIG. 3, exemplary additional operations are given, which are inherently independent from each other as such. According to such variation, an exemplary method according to exemplary embodiments of the present invention may comprise an operation of receiving a key performance indicator optimization input indicative of a demanded optimization of an indicated key performance indicator, and an operation of creating a new key performance indicator entry or updating an existing key performance indicator entry in said plurality of key performance indicator entries corresponding to said demanded optimization of said indicated key performance indicator.

According to a variation of the procedure shown in FIG. 3 directed to an Objective Definition Operation (ODO) explained below in more detail, said key performance indicator optimization input comprises at least said optimization direction of said indicated key performance indicator, an optimal target value for said indicated key performance indicator, and a target value generation step size, and said creating or updating is based on said optimization direction of said indicated key performance indicator, said optimal target value for said indicated key performance indicator, and said target value generation step size.

According to a variation of the procedure shown in FIG. 3 directed to the Objective Definition Operation (ODO) explained below in more detail, exemplary details of the creating or updating operation are given, which are inherently independent from each other as such.

Such exemplary creating or updating operation according to exemplary embodiments of the present invention may comprise an operation of generating a highest priority value of said prioritized target values for said indicated key performance indicator by adopting said optimal target value for said indicated key performance indicator and a predetermined number of lower priority values with decreasing priority by, dependent on said optimization direction of said indicated key performance indicator, adding or subtracting said target value generation step size to or from the preceding generated target value.

According to a variation of the procedure shown in FIG. 3 directed to the Objective Definition Operation (ODO) explained below in more detail, said key performance indicator optimization input is defined as setKPI_Objective KPI_name Objective optimal_target KPI_step, with KPI_name being a name of said indicated key performance indicator, Objective being said optimization direction of said indicated key performance indicator, optimal_target being said optimal target value for said indicated key performance indicator, and KPI_step being said target value generation step size.

According to a variation of the procedure shown in FIG. 3 directed to a Target Definition Operation (TDO) explained below in more detail, said key performance indicator optimization input comprises at least said optimization direction of said indicated key performance indicator and said prioritized target values for said indicated key performance indicator, and said creating or updating is based on said optimization direction of said indicated key performance indicator and said prioritized target values for said indicated key performance indicator.

According to a variation of the procedure shown in FIG. 3 directed to the Target Definition Operation (TDO) explained below in more detail, exemplary details of the creating or updating operation are given, which are inherently independent from each other as such.

Such exemplary creating or updating operation according to exemplary embodiments of the present invention may comprise an operation of adopting said prioritized target values for said indicated key performance indicator.

According to a variation of the procedure shown in FIG. 3 directed to the Target Definition Operation (TDO) explained below in more detail, said key performance indicator optimization input is defined as setKPI_targets KPI_name: [Objective, K[1] value, K[2] value, . . . , K[k] value], with KPI_name being a name of said indicated key performance indicator, Objective being said optimization direction of said indicated key performance indicator, and K[k] value being the target value with priority k.

According to the variation of the procedure shown in FIG. 3 directed to the Target Definition Operation (TDO) explained below in more detail, said key performance indicator optimization input comprises information in relation to a context in which said optimization direction of said indicated key performance indicator and said prioritized target values for said indicated key performance indicator are expected to be achieved by a respective cognitive function.

According to a variation of the procedure shown in FIG. 3 directed to a Target Adjustment Operation (TAO) explained below in more detail, said key performance indicator optimization input comprises at least a modification direction of said indicated key performance indicator and a target value modification step size, and said updating is based on said modification direction of said indicated key performance indicator and said target value modification step size.

According to a variation of the procedure shown in FIG. 3 directed to the Target Adjustment Operation (TAO) explained below in more detail, exemplary details of the updating operation are given, which are inherently independent from each other as such.

Such exemplary updating operation according to exemplary embodiments of the present invention may comprise an operation of re-generating each target value of said prioritized target values by, dependent on said modification direction of said indicated key performance indicator, adding or subtracting said target value modification step size to or from said each target value of said prioritized target values.

According to a variation of the procedure shown in FIG. 3 directed to a Target Adjustment Operation (TAO) explained below in more detail, said key performance indicator optimization input is defined as Lower_KPItargets KPI_name KPI_step, with KPI_name being a name of said indicated key performance indicator, and KPI_step being said target value modification step size.

According to further exemplary embodiments of the present invention, said receiving said key performance indicator optimization input utilizes a first interface to a higher instance.

According to a variation of the procedure shown in FIG. 3, exemplary additional operations are given, which are inherently independent from each other as such. According to such variation, an exemplary method according to exemplary embodiments of the present invention may comprise an operation of receiving, in response to said providing (S32), from said cognitive function, observations with respect to achieving said prioritized target values for said selected key performance indicator by said cognitive function, wherein said updating is based on said observations.

According to a variation of the procedure shown in FIG. 3, exemplary additional operations are given, which are inherently independent from each other as such. According to such variation, an exemplary method according to exemplary embodiments of the present invention may comprise an operation of receiving, in response to said providing (S32), from said cognitive function, observations with respect to achieving said prioritized target values for said selected key performance indicator by said cognitive function, and an operation of reporting on conflicts to a higher instance based on said observations.

According to a variation of the procedure shown in FIG. 3, exemplary additional operations are given, which are inherently independent from each other as such. According to such variation, an exemplary method according to exemplary embodiments of the present invention may comprise an operation of checking consistency of said prioritized target values of each of said maintained plurality of key performance indicator entries with said optimization direction of said respective key performance indicator and/or external requirements on said prioritized target values for said respective key performance indicator.

According to further exemplary embodiments of the present invention, said providing (S32) said prioritized target values for said selected key performance indicator utilizes a second interface to a plurality of cognitive functions.

In more specific terms, the NOM according to exemplary embodiments of the present invention abstracts the lower KPI targets into higher operational goals through an internal structure or map of KPI priorities.

Figure 5:
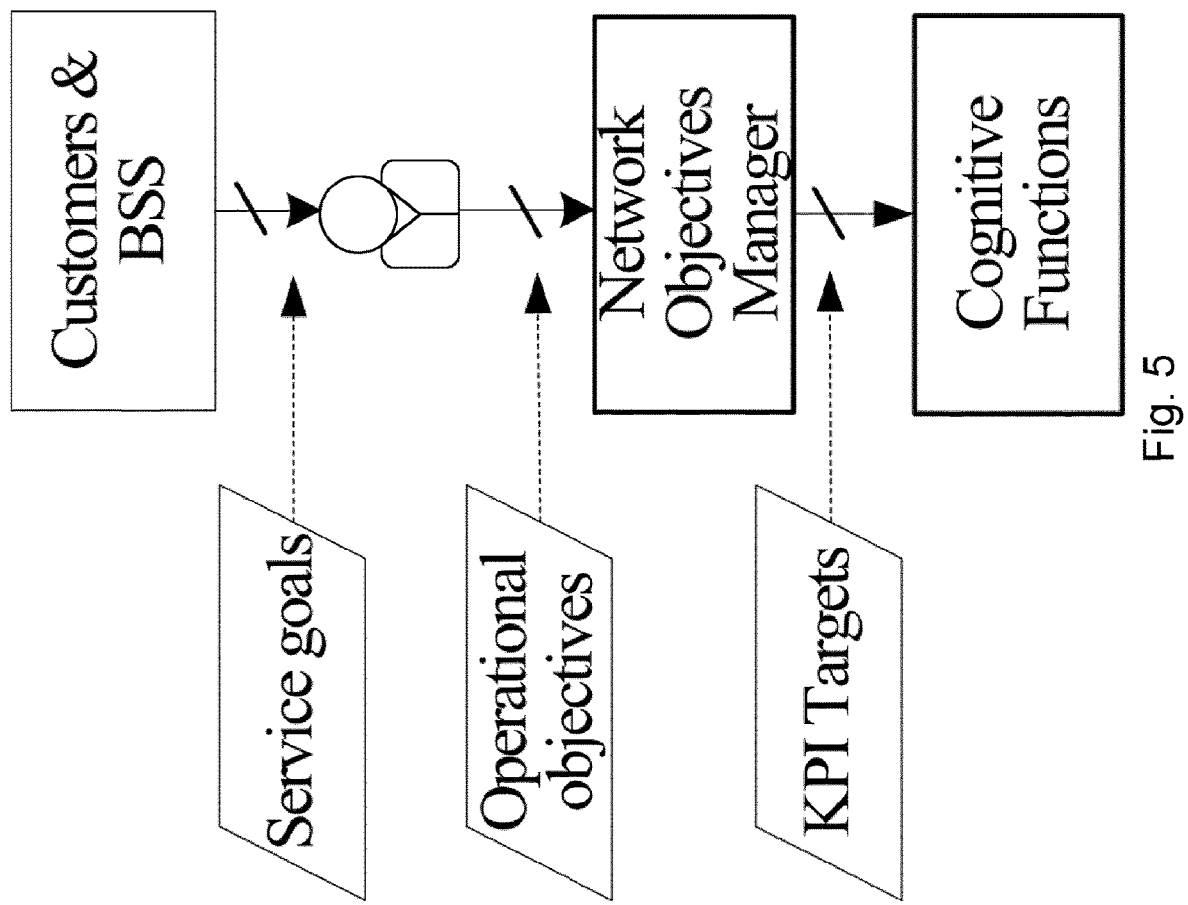
FIG. 5 is a schematic diagram illustrating an example of a system environment and in particular differences among information exchanged at different functionalities of service and network management levels according to exemplary embodiments of the present invention.

Goals, objectives and targets:

These levels of abstraction are related to each other and to the service goals according to the illustration in FIG. 5.

FIG. 5 is a schematic diagram illustrating an example of a system environment and in particular differences among information exchanged at different functionalities of service and network management levels according to exemplary embodiments of the present invention.

1) Service goals are derived from expectations and requirements of the supported services, i.e. the QoE measured in terms of latency, availability, etc. An example service goal may for example be "to improve availability", "to reduce service interruption", and/or "lower latency".

2) Operational Objectives describe to maximize/minimize KPI $k \in K$ while maintaining KPIs $i \in K$ ($i \neq k$) in acceptable states. To aid in setting the targets, according to exemplary embodiments of the present invention, the operational objective may be augmented with extra information including, e.g., the steps between the different prioritization levels. The term objective used here refers to a specific task of either a minimization or a maximization, while operational objective may be a sub task aimed at the achieving the minimization or maximization, e.g. the reduction of the target value. The operational objectives and their related operations are the inputs of the operator to the NOM.

3) KPI Priority levels: To allow for coordination among conflicting KPIs, according to exemplary embodiments of the present invention there are provided different desirability levels for the values of a given KPI, with the most stringent being the one that must be achieved regardless of conditions. The priorities attempt to distinguish the values (V1, V2, . . . Vn) of a KPI in statement as: "V1 must be achieved", "V2 would be preferred if possible", . . . , "Vn is the best value that is expected". The prioritization structure is an internal design of the NOM that supports in managing conflicts and constraints among the KPIs.

4) Internal targets are the lower level expectation to be specified for each unidimensional cognitive function and for the multi-objective CNM functions like the controller and coordination function. It requires the optimization function to "ensure that KPI achieves a value v with priority p, i.e. $k<=[kTj, j=1, \ldots n]$ with priority $[pj, j=1, \ldots n]$". The assumption here is that the target set in the achievement as a certain KPI level will not degrade another KPI target at the same or higher priority. Note that targets may be context specific, but they do not have to be, since the underlying CFs are after all expected to learn context specific behavior.

5) CF KPI targets are the specific requirements set for the CFs as output from the NOM.

Figure 6:
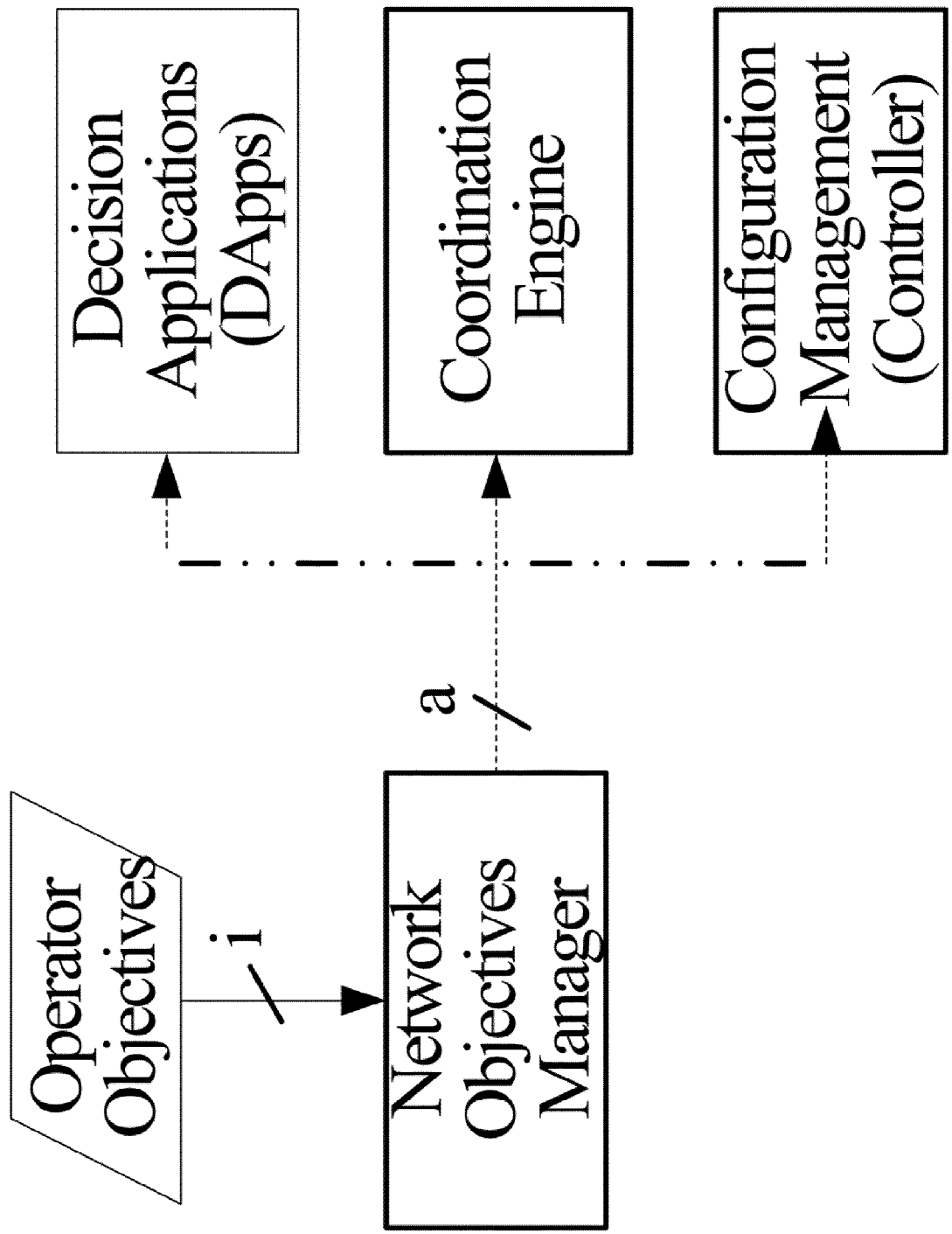
FIG. 6 is a schematic diagram illustrating an example of a system environment and in particular interfacing the NOM with the operator and cognitive functions according to exemplary embodiments of the present invention.

Input-output interfaces:

According to exemplary embodiments of the present invention, the NOM is characterized by two interfaces—the operator interface here labelled i, and the CFs interface here labelled a—both illustrated in FIG. 6.

FIG. 6 is a schematic diagram illustrating an example of a system environment and in particular interfacing the NOM with the operator and cognitive functions according to exemplary embodiments of the present invention.

Through interface i, the operator submits the operational objectives and controls the NOM and subsequently the behavior of the CF and the underlying network.

According to exemplary embodiments of the present invention, the operator may for example define, edit and then adjust targets as well as set KPI priorities based on the desired expectations of service performance.

In return, the NOM informs the operator about its observations on the network, e.g. on observed conflicts and constraints that cannot be resolved.

According to exemplary embodiments of the present invention, the NOM may for example indicate that a particular KPI target cannot be achieved owing to some other KPI that would otherwise be degraded. The operator may then correspondingly have to change the prioritizations of KPIs.

On interface a, the NOM defines the expectations for each CF and for the CNM. These expectations are specifically the targets to be achieved by the CNM on the particular KPIs.

Such targets should have accounted for the potential conflicts among the KPIs so that a higher priority KPI target should be achieved by all means—even at the cost of degrading a lower priority KPI.

In return, according to exemplary embodiments of the present invention, CFs return information relating to their observations to which the NOM is supposed to respond. The CE may for example highlight targets that cannot be reached, e.g. due to conflicts among the targets. Such a response could be that "target x cannot be achieved because it causes problems on higher priority target y".

According to exemplary embodiments of the present invention, the NOM then either adjusts the set targets and prioritizations or requests further guidance from the operator.

In concrete terms, a requirement underlying exemplary embodiments of the present invention is that each KPI must have target values with varying prioritization.

Thus, according to the present invention, a generic priority function is defined with k priority levels, i.e. $P=[1, 2, \ldots, k]$, where the lower the priority level is, the more desirable a target is.

For example if KPI K targets K[i] such that K[1]=0.5, K[2]=0.4 and k[3]=0.3, it implies that the most desired target for the KPI is 0.5 followed by 0.4, and finally 0.3. In other words, values of K>0.5 are totally unacceptable but values of say K<0.3 may be desired if no other KPIs are adversely affected.

Figure 7:
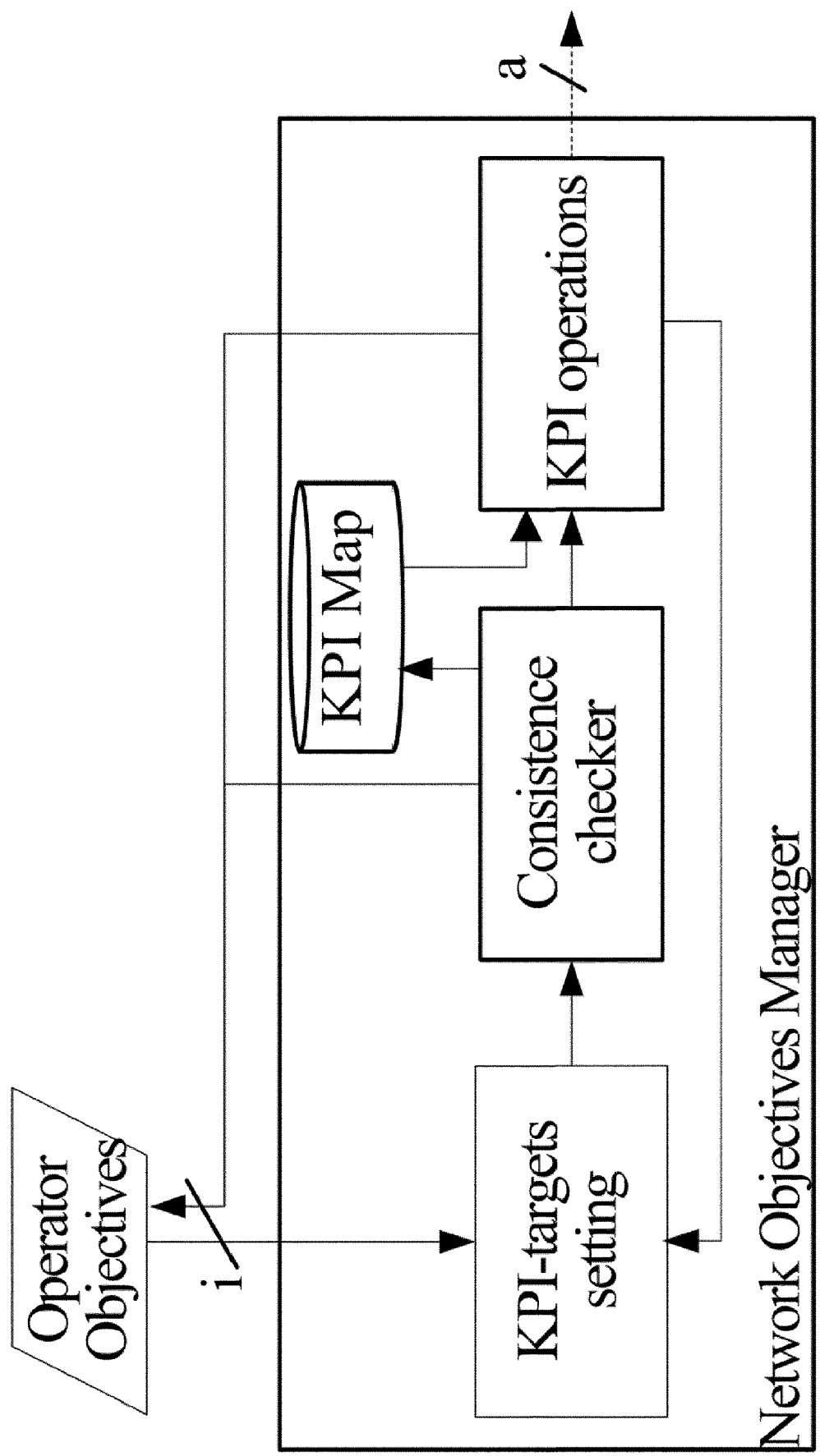
FIG. 7 is a schematic diagram illustrating an example of a system environment and in particular constituent components of a NOM according to exemplary embodiments of the present invention.

Components:

To be able to take high-level operator goals and derive specific targets for the CFs, according to exemplary embodiments of the present invention, the NOM is composed of four modules as illustrated in FIG. 7.

FIG. 7 is a schematic diagram illustrating an example of a system environment and in particular constituent components of a NOM according to exemplary embodiments of the present invention.

The present invention is not limited to the structure illustrated in FIG. 7. Instead, some modules illustrated in FIG. 7 may be merged, or the functionality of a module shown in FIG. 7 may be divided into two or more (sub) modules.

1) A KPI data base that holds information on all managed KPIs. Within the NOM, each KPI may be identified with the following fields:

{KPI_name, [contexts], objective=min/max, optimal_value, default_step_size, targets};

2) A KPI-targets management module which creates and optimizes the targets at the different levels. For example, given a KPI name, an objective and step size, the KPI-targets management module creates the targets at the different prioritizations. The KPI-targets management module can also adjust existing KPI targets on request, e.g. by adjusting each of the target values by a value equivalent to the step_size.

3) A consistent checker that ensures that the targets to be published are consistent with the selected objective. According to exemplary embodiments of the present invention, the consistent checker may also need to refer to other KPIs in the map. According to exemplary embodiments of the present invention, the consistent checker may also learn the correlations among KPIs, namely, even the operations need to figure out how much they impact each other. According to exemplary embodiments of the present invention, the consistent checker may verify how and what to learn from the a-interface.

4) A KPI operations module that manages the instantaneous target values for different KPIs. For example, if for a given KPI a target cannot be met, the KPI operations module may adjust the value as needed.

Input interface:

According to exemplary embodiments of the present invention, the input interface captures the operators' requirements from the network. According to exemplary embodiments of the present invention, the following operations can be performed:

Objective Definition Operation (ODO)

According to the ODO, targets may be derived from a higher-level objective function. According to exemplary embodiments of the present invention, a means is provided to manually set the objectives, i.e. a command through the operator sets the targets for a given KPI. The respective interface for a KPI named "KPI-name" may be defined with a step-size "KPI_step" between priority levels in the form setKPI_Objective KPI_name Objective optimal_target KPI_step;

According to exemplary embodiments of the present invention, the respective KPI targets are then computed by the target setting module and subsequently evaluated by the consistence checker before being published to the CFs.

Target Definition Operation (TDO)

According to exemplary embodiments of the present invention, for the TDO a means is provided to manually set the targets, i.e. by using a command with which the operator sets the targets for a given KPI. The respective interface for a KPI named "KPI_name" over "k" priority levels may be a command in the form setKPI_targets KPI_name: [Objective, K[1] value, K[2] value, . . . , K[k] value];

As earlier stated, according to exemplary embodiments of the present invention, the target may also be context specific in which case the interface may be in the form setKPI_targets (KPI_name, context 1): [Objective, K[1] value, K[2] value, . . . , K[k] value];

According to exemplary embodiments of the present invention, the thus input objective is then first evaluated by the consistence checker before being published to the CFs.

According to further exemplary embodiments of the present invention, the TDO may also be used to edit an existing target, e.g. a target which was created automatically.

Target Adjustment Operation (TAO)

According to exemplary embodiments, the operator is able to request for a certain KPI's targets to be adjusted, e.g. on realizing that they block optimization of another KPI. In case of such command, the NOM adjusts all the priorities of the KPI's targets either by a value equivalent to the default step_size or by an optionally stated step size "KPI_step". According to exemplary embodiments of the present invention, a corresponding command may be in the form Lower_KPItargets KPI_name KPI_step;

Return Interface

According to exemplary embodiments of the present invention, in case a target cannot be reached, the CF/CNM is able to inform the NOM of such conflict(s). As already mentioned above, the NOM may then either automatically adjust the targets or inform the operator about such conflict(s).

Output Interface:

The output of the NOM according to exemplary embodiments of the present invention is a specification of the targets for each or all the CFs.

A message on the on the output interface specifies a hash of kpi to kpi-target, i.e. for n KPI indexed by j=1, 2, . . . , n, the target specification message is according to exemplary embodiments of the present invention:

```
{
    K1: K1_target;
    K2: K2_target;
    K3: K3_target;
```

```
            Kn: Kn_target;
        }
```

Here, Kj_target is a vector of prioritized KPI targets. For consistence, the target vector may include the objective for the KPI (i.e. either to minimize or to maximize the KPI). However, the embodiments of the present invention are not limited thereto. In particular, as the objective for the KPI can be deduced from the target values, it does not have to be explicitly included.

The targets may optionally be set in a context specific way. Such way of implementation this is however not mandatory (and thus, exemplary embodiments of the present invention refrain therefrom), as the learning function should be able to learn context specific actions. For the context specific target setting, the hash key is according to exemplary embodiments of the present invention a combination of KPI and context:

```
        {
            (K1, context 1): K1_context_1_target;
            (K1, context 2): K1_context_2_target;
                    .
                    .
            (K1, context m): K1_context_m_target;
                    .
                    .
            (Kn, context 1): Kn_context_1_target;
            (Kn, context 2): Kn_context_2_target;
                    .
                    .
            (Kn, context m): Kn_context_m_target;
        }
```

Figure 8:
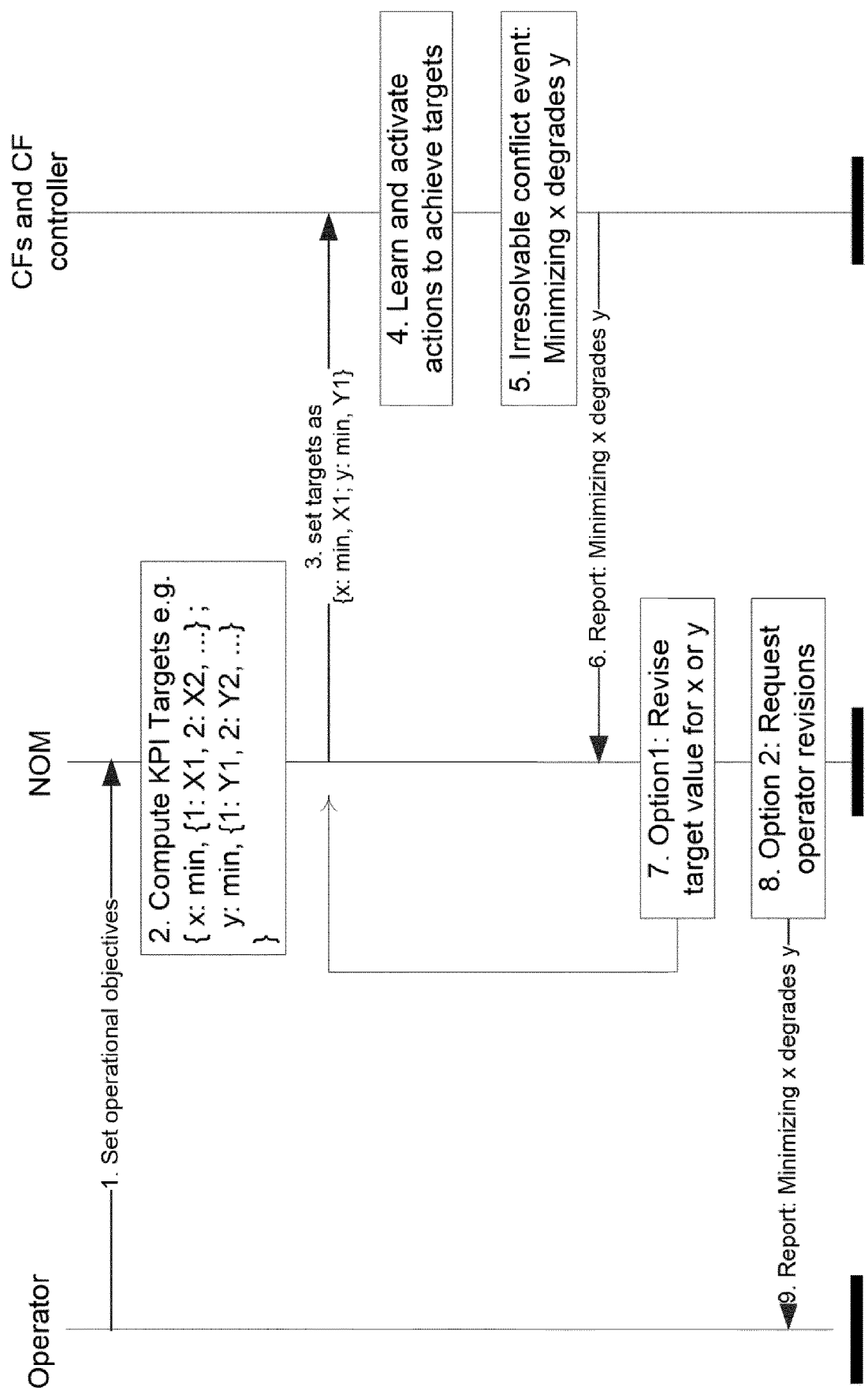
FIG. 8 is a schematic diagram illustrating an example of a system environment with signaling variants according to exemplary embodiments of the present invention.

FIG. 8 (in a CAN framework including functions of a CAN system an related cognitive functions) is a schematic diagram illustrating a example of a system environment with signaling variants according to exemplary embodiments of the present invention, in particular a concrete example of a response to conflicts among KPI targets.

Specifically, in FIG. 8 an example operation of the NOM together with the larger CNM system is illustrated.

In step 1 of FIG. 8, the operator sets operational objectives.

In step 2 of FIG. 8, the NOM computes KPI targets, e.g.

```
        {
            x: min, {1: X1, 2: X2, ...};
            y: min, {1: Y1, 2: Y2, ...}
        }
```

In step 3 of FIG. 8, the NOM sets targets as {KPI: objective, target_value}. For the example, setting of two KPIs x, y with the objectives minimize x and minimize y and targets set as {x: min, X1; y: min, Y1} is assumed.

In step 4 of FIG. 8, CFs/CNM execute to achieve targets, i.e., learns and activates actions to achieve the targets.

In step 5 of FIG. 8, CFs/CNM notice a lock, i.e., an irresolvable conflict event, when minimizing x degrades y, for example, with x at level X2 on trying to further minimize x, y increases beyond the already achieved target Y1.

In step 6 of FIG. 8, CFs/CNM reports to NOM that minimizing x degrades y, e.g., CNM controller reports to NOM that target y is blocking the system from achieving target X1.

Based on this reporting, the NOM may either (option 1, step 7 of FIG. 8) revise the target value for x or y, or may (option 2, step 8 of FIG. 8) request operator revisions. Upon option 2, in step 9 of FIG. 8, the NOM reports to the operator that minimizing x degrades y.

In other words, based on the reporting of the CFs/CNM/CNM controller, according to this specific example, the NOM either:

a) Based on its known prioritizations, raises target_value for y to Y1+y_step, or b) Based on its known prioritizations, raises target_value for x to X1+y_step, or c) If (e.g.) already adjusted the targets earlier, requests the operator to reconsider the given prioritizations.

According to the present invention, the management of performance targets for cognitive functions is advantageously simplified, and a need for operators to manually set the values of the optimization targets is removed. Hence, due to implementation of the present invention, operators can advantageously instead focus on the translation of higher level service goals into operational objectives.

The above-described procedures and functions may be implemented by respective functional elements, processors, or the like, as described below.

In the foregoing exemplary description of the network entity, only the units that are relevant for understanding the principles of the invention have been described using functional blocks. The network entity may comprise further units that are necessary for its respective operation. However, a description of these units is omitted in this specification. The arrangement of the functional blocks of the devices is not construed to limit the invention, and the functions may be performed by one block or further split into sub-blocks.

When in the foregoing description it is stated that the apparatus, i.e. network node (or some other means) is configured to perform some function, this is to be construed to be equivalent to a description stating that a (i.e. at least one) processor or corresponding circuitry, potentially in cooperation with computer program code stored in the memory of the respective apparatus, is configured to cause the apparatus to perform at least the thus mentioned function. Also, such function is to be construed to be equivalently implementable by specifically configured circuitry or means for performing the respective function (i.e. the expression "unit configured to" is construed to be equivalent to an expression such as "means for").

In FIG. 9, an alternative illustration of an apparatus according to exemplary embodiments of the present invention is depicted. As indicated in FIG. 9, according to exemplary embodiments of the present invention, the apparatus (network node) 10' (corresponding to the network node 10) for enabling network objectives management in radio access networks comprises a processor 91, a memory 92 and an interface 93, which are connected by a bus 94 or the like, and the apparatus may be connected via link 99 to e.g. other apparatuses.

The processor 91 and/or the interface 93 may also include a modem or the like to facilitate communication over a (hardwire or wireless) link, respectively. The interface 93 may include a suitable transceiver coupled to one or more antennas or communication means for (hardwire or wireless) communications with the linked or connected device(s), respectively.

The interface 93 is generally configured to communicate with at least one other apparatus, i.e. the interface thereof.

The memory 92 may store respective programs assumed to include program instructions or computer program code that, when executed by the respective processor, enables the respective electronic device or apparatus to operate in accordance with the exemplary embodiments of the present invention.

In general terms, the respective devices/apparatuses (and/or parts thereof) may represent means for performing respective operations and/or exhibiting respective functionalities, and/or the respective devices (and/or parts thereof) may have functions for performing respective operations and/or exhibiting respective functionalities.

When in the subsequent description it is stated that the processor (or some other means) is configured to perform some function, this is to be construed to be equivalent to a description stating that at least one processor, potentially in cooperation with computer program code stored in the memory of the respective apparatus, is configured to cause the apparatus to perform at least the thus mentioned function. Also, such function is to be construed to be equivalently implementable by specifically configured means for performing the respective function (i.e. the expression "processor configured to [cause the apparatus to] perform xxx-ing" is construed to be equivalent to an expression such as "means for xxx-ing").

According to exemplary embodiments of the present invention, an apparatus representing the network node 10 for enabling network objectives management in radio access networks comprises at least one processor 91, at least one memory 92 including computer program code, and at least one interface 93 configured for communication with at least another apparatus. The processor (i.e. the at least one processor 91, with the at least one memory 92 and the computer program code) is configured to perform maintaining a plurality of key performance indicator entries, each key performance indicator entry comprising at least an optimization direction of a respective key performance indicator and prioritized target values for said respective key performance indicator (thus the apparatus comprising corresponding means for maintaining), and to perform providing said prioritized target values for a selected key performance indicator expected to be achieved by a cognitive function to said cognitive function (thus the apparatus comprising corresponding means for providing).

For further details regarding the operability/functionality of the individual apparatuses, reference is made to the above description in connection with any one of FIGS. 1 to 9, respectively.

For the purpose of the present invention as described herein above, it should be noted that method steps likely to be implemented as software code portions and being run using a processor at a network server or network entity (as examples of devices, apparatuses and/or modules thereof, or as examples of entities including apparatuses and/or modules therefore), are software code independent and can be specified using any known or future developed programming language as long as the functionality defined by the method steps is preserved;

generally, any method step is suitable to be implemented as software or by hardware without changing the idea of the embodiments and its modification in terms of the functionality implemented;

method steps and/or devices, units or means likely to be implemented as hardware components at the above-defined apparatuses, or any module(s) thereof, (e.g., devices carrying out the functions of the apparatuses according to the embodiments as described above) are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components;

devices, units or means (e.g. the above-defined network entity or network register, or any one of their respective units/means) can be implemented as individual devices, units or means, but this does not exclude that they are implemented in a distributed fashion throughout the system, as long as the functionality of the device, unit or means is preserved;

an apparatus like the user equipment and the network entity/network register may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;

a device may be regarded as an apparatus or as an assembly of more than one apparatus, whether functionally in cooperation with each other or functionally independently of each other but in a same device housing, for example.

In general, it is to be noted that respective functional blocks or elements according to above-described aspects can be implemented by any known means, either in hardware and/or software, respectively, if it is only adapted to perform the described functions of the respective parts. The mentioned method steps can be realized in individual functional blocks or by individual devices, or one or more of the method steps can be realized in a single functional block or by a single device.

Generally, any method step is suitable to be implemented as software or by hardware without changing the idea of the present invention. Devices and means can be implemented as individual devices, but this does not exclude that they are implemented in a distributed fashion throughout the system, as long as the functionality of the device is preserved. Such and similar principles are to be considered as known to a skilled person.

Software in the sense of the present description comprises software code as such comprising code means or portions or a computer program or a computer program product for performing the respective functions, as well as software (or a computer program or a computer program product) embodied on a tangible medium such as a computer-readable (storage) medium having stored thereon a respective data structure or code means/portions or embodied in a signal or in a chip, potentially during processing thereof.

The present invention also covers any conceivable combination of method steps and operations described above, and any conceivable combination of nodes, apparatuses, modules or elements described above, as long as the above-described concepts of methodology and structural arrangement are applicable.

In view of the above, there are provided measures for network objectives management. Such measures for enabling network objectives management in radio access networks exemplarily comprise maintaining a plurality of key performance indicator entries, each key performance indicator entry comprising at least an optimization direction of a respective key performance indicator and prioritized target values for said respective key performance indicator, and providing said prioritized target values for a selected key performance indicator expected to be achieved by a cognitive function to said cognitive function.

Even though the invention is described above with reference to the examples according to the accompanying drawings, it is to be understood that the invention is not restricted thereto. Rather, it is apparent to those skilled in the art that the present invention can be modified in many ways without departing from the scope of the inventive idea as disclosed herein.

LIST OF ACRONYMS AND ABBREVIATIONS

3GPP Third Generation Partnership Project
CE Coordination Engine
CF cognitive function
CME Configuration Management Engine
CNM cognitive network management
DAE Decision & Action Engine
EMA Environment Modelling & Abstraction
KPI key performance indicator
LTE Long Term Evolution
LTE-A Long Term Evolution Advanced
NM network management
NOM Network Objective(s) Manager
OAM operations, administration and management
OBNM objective based network management
ODO Objective Definition Operation
QoE Quality of Experience
RAN radio access network
SON self-organizing networks
TAO Target Adjustment Operation
TDO Target Definition Operation

The invention claimed is:

1. An apparatus for enabling network objectives management in radio access networks, the apparatus comprising
at least one processor,
at least one memory including computer program code, and
at least one interface configured for communication with at least another apparatus,
the at least one processor, with the at least one memory and the computer program code, being configured to cause the apparatus to perform:
maintaining a plurality of key performance indicator entries, each key performance indicator entry comprising at least an optimization direction of a respective key performance indicator and prioritized target values for said respective key performance indicator,
providing said prioritized target values for a selected key performance indicator expected to be achieved by a cognitive function to said cognitive function;
receiving a key performance indicator optimization input indicative of a demanded optimization of an indicated key performance indicator, and
creating a new key performance indicator entry or updating an existing key performance indicator entry in said plurality of key performance indicator entries corresponding to said demanded optimization of said indicated key performance indicator.

2. The apparatus according to claim 1, wherein
said key performance indicator optimization input comprises at least said optimization direction of said indicated key performance indicator, an optimal target value for said indicated key performance indicator, and a target value generation step size, and said creating or updating is based on said optimization direction of said indicated key performance indicator, said optimal target value for said indicated key performance indicator, and said target value generation step size.

3. The apparatus according to claim 2, wherein
in relation to said creating or updating, the at least one processor, with the at least one memory and the computer program code, being further configured to cause the apparatus to perform
generating a highest priority value of said prioritized target values for said indicated key performance indicator by adopting said optimal target value for said indicated key performance indicator and a predetermined number of lower priority values with decreasing priority by, dependent on said optimization direction of said indicated key performance indicator, adding or subtracting said target value generation step size to or from the preceding generated target value.

4. The apparatus according to claim 3, wherein
said key performance indicator optimization input comprises information in relation to a context in which said optimization direction of said indicated key performance indicator and said prioritized target values for said indicated key performance indicator are expected to be achieved by a respective cognitive function.

5. The apparatus according to claim 1, wherein
said key performance indicator optimization input comprises at least said optimization direction of said indicated key performance indicator and said prioritized target values for said indicated key performance indicator, and
said creating or updating is based on said optimization direction of said indicated key performance indicator and said prioritized target values for said indicated key performance indicator.

6. The apparatus according to claim 5, wherein
in relation to said creating or updating, the at least one processor, with the at least one memory and the computer program code, being further configured to cause the apparatus to perform
adopting said prioritized target values for said indicated key performance indicator.

7. The apparatus according to claim 1, wherein
said key performance indicator optimization input comprises at least a modification direction of said indicated key performance indicator and a target value modification step size, and
said updating is based on said modification direction of said indicated key performance indicator and said target value modification step size.

8. The apparatus according to claim 7, wherein
in relation to said updating, the at least one processor, with the at least one memory and the computer program code, being further configured to cause the apparatus to perform
re-generating each target value of said prioritized target values by, dependent on said modification direction of said indicated key performance indicator, adding or subtracting said target value modification step size to or from said each target value of said prioritized target values.

9. The apparatus according to claim 1, wherein
the at least one processor, with the at least one memory and the computer program code, being further configured to cause the apparatus to perform receiving, in response to said providing, from said cognitive function, observations with respect to achieving said prioritized target values for said selected key performance indicator by said cognitive function, wherein said updating is based on said observations.

10. The apparatus according to claim 1, wherein
the at least one processor, with the at least one memory and the computer program code, being further configured to cause the apparatus to perform
receiving, in response to said providing, from said cognitive function, observations with respect to achieving said prioritized target values for said selected key performance indicator by said cognitive function, and
reporting on conflicts to a higher instance based on said observations.

11. The apparatus according to claim 1, wherein
the at least one processor, with the at least one memory and the computer program code, being further configured to cause the apparatus to perform
checking consistency of said prioritized target values of each of said maintained plurality of key performance indicator entries with said optimization direction of said respective key performance indicator and/or external requirements on said prioritized target values for said respective key performance indicator.

12. The apparatus according to claim 1, wherein
said providing said prioritized target values for said selected key performance indicator utilizes a second interface to a plurality of cognitive functions.

13. A method for enabling network objectives management in radio access networks, the method comprising
maintaining a plurality of key performance indicator entries, each key performance indicator entry comprising at least an optimization direction of a respective key performance indicator and prioritized target values for said respective key performance indicator,
providing said prioritized target values for a selected key performance indicator expected to be achieved by a cognitive function to said cognitive function,
receiving a key performance indicator optimization input indicative of a demanded optimization of an indicated key performance indicator, and
creating a new key performance indicator entry or updating an existing key performance indicator entry in said plurality of key performance indicator entries corresponding to said demanded optimization of said indicated key performance indicator.

14. The method according to claim 13, wherein
said key performance indicator optimization input comprises at least said optimization direction of said indicated key performance indicator, an optimal target value for said indicated key performance indicator, and a target value generation step size, and
said creating or updating is based on said optimization direction of said indicated key performance indicator, said optimal target value for said indicated key performance indicator, and said target value generation step size.

15. The method according to claim 14, wherein
in relation to said creating or updating, the method further comprises
generating a highest priority value of said prioritized target values for said indicated key performance indicator by adopting said optimal target value for said indicated key performance indicator and a predetermined number of lower priority values with decreasing priority by, dependent on said optimization direction of said indicated key performance indicator, adding or subtracting said target value generation step size to or from the preceding generated target value.

16. The method according to claim 14, further comprising
receiving, in response to said providing, from said cognitive function, observations with respect to achieving said prioritized target values for said selected key performance indicator by said cognitive function, wherein
said updating is based on said observations.

17. The method according to claim 13, wherein
said key performance indicator optimization input comprises at least said optimization direction of said indicated key performance indicator and said prioritized target values for said indicated key performance indicator, and
said creating or updating is based on said optimization direction of said indicated key performance indicator and said prioritized target values for said indicated key performance indicator.

18. The method according to claim 13, further comprising
checking consistency of said prioritized target values of each of said maintained plurality of key performance indicator entries with said optimization direction of said respective key performance indicator and/or external requirements on said prioritized target values for said respective key performance indicator.

19. An apparatus for enabling network objectives management in radio access networks, the apparatus comprising
maintaining circuitry configured to maintain a plurality of key performance indicator entries, each key performance indicator entry comprising at least an optimization direction of a respective key performance indicator and prioritized target values for said respective key performance indicator,
providing circuitry configured to provide said prioritized target values for a selected key performance indicator expected to be achieved by a cognitive function to said cognitive function;
receiving circuitry configured to receive a key performance indicator optimization input indicative of a demanded optimization of an indicated key performance indicator, and
creating circuitry configured to create a new key performance indicator entry or updating an existing key performance indicator entry in said plurality of key performance indicator entries corresponding to said demanded optimization of said indicated key performance indicator.

* * * * *